(12) United States Patent
Fujiyoshi

(10) Patent No.: US 6,384,925 B1
(45) Date of Patent: *May 7, 2002

(54) INFORMATION PROCESSING APPARATUS AND METHOD OF CONTROLLING SAME

(75) Inventor: Hiroyuki Fujiyoshi, Funabashi (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,767

(22) Filed: Apr. 28, 1997

(30) Foreign Application Priority Data

May 1, 1996 (JP) .............................................. 8-110810

(51) Int. Cl.$^7$ ............................................... G06F 15/00
(52) U.S. Cl. ..................................... 358/1.15; 358/1.14
(58) Field of Search ................................ 395/112, 113, 395/114, 800, 500; 364/930; 358/1.14, 1.12, 1.13, 1.11, 1.15, 1.16, 1.17; 355/203

(56) References Cited

U.S. PATENT DOCUMENTS

| | | | | |
|---|---|---|---|---|
| 4,498,187 A | * | 2/1985 | Soderberg et al. | 375/117 |
| 5,220,674 A | * | 6/1993 | Morgan et al. | 395/800 |
| 5,625,757 A | * | 4/1997 | Kageyama et al. | 395/113 |
| 6,003,065 A | * | 12/1999 | Yan et al. | 709/201 |
| 6,029,238 A | * | 2/2000 | Furukawa | 712/1 |

* cited by examiner

Primary Examiner—David Moore
Assistant Examiner—Doug Tran
(74) Attorney, Agent, or Firm—Fitzpatrick, Cella, Harper & Scinto

(57) ABSTRACT

Provided is an information processing apparatus having a function for outputting data to a plurality of output units, wherein the usage of each output unit is clarified and output processing is executed efficiently and smoothly. A main printer, an auxiliary printer and a disallowed printer are designated. If a problem (paper depletion, jamming, toner depletion, etc.) develops in the main printer during the course of a printing operation being executed using the main printer, printing is continued using the auxiliary printer. Use of the disallowed printer is inhibited in order that it may serve as a printer dedicated to another information processing apparatus.

39 Claims, 7 Drawing Sheets

FIG. 3

REGISTRATION TABLE 300

| PRINTER NAME | PRINTER PRIORITY | PRINTER LOCATION |
|---|---|---|
| LBP1 | 1 (MAIN PRINTER) | LPT1 |
| LBP2 | 2 (AUXILIARY PRINTER) | LPT2 |
| LBP3 | 3 (OTHER PRINTER) | LPT3 |
| LBP4 | 0 (DISALLOWED PRINTER) | LPT4 |

INFORMATION PROCESSING APPARATUS AND METHOD OF CONTROLLING SAME

BACKGROUND OF THE INVENTION

This invention relates to an information processing apparatus and to a method of controlling the same. More particularly, the invention relates to an information processing apparatus having a function for outputting data to a plurality of output units, and to a method of controlling the apparatus.

Conventionally, in a printer system having a plurality of printers, all of the printers are handled equivalently and it is not possible to set an order of precedence for the printers or to inhibit use of a specific printer or printers. Moreover, if a problem develops when a printing operation is in progress, it is necessary that printing be executed again after the problem is eliminated.

As a consequence of the foregoing, a specific printer cannot be allocated as the main printer used exclusively under normal conditions, and a specific printer cannot be allocated as an auxiliary printer used only when the main printer develops a problem. In addition, use of the specific printer cannot be inhibited in a case where the specific printer is desired to be used exclusively for another terminal, a case where printing qualities are to be uniformalized, a case where the printer has been installed at a remote location or a case where it is desired to hold down printing costs.

Furthermore, when a printer develops a problem, a user who has instructed printing operation does not realize the problem unless the user stays near the terminal or the printer performing printing operation until the printing operation ends. Thus, the printer is often left in a condition where printing operation is suspended.

SUMMARY OF THE INVENTION

Accordingly, an object of the present invention is to provide an information processing apparatus having a function for outputting data to a plurality of output units, wherein the usage of each output unit is clarified and output processing is executed efficiently and smoothly.

According to the present invention, the foregoing object is attained by providing an information processing apparatus having a function for outputting data to a plurality of output units, comprising first specifying means for specifying one of the plurality of output units as a main output unit, second specifying means for specifying one of the output units as an auxiliary output unit, investigating means for investigating each output unit to determine whether the output unit has developed a problem, and data supply means for supplying data to the specified main output unit if the main output unit has not developed a problem, and supplying data to the specified auxiliary output unit if the main output unit has developed a problem.

In a preferred embodiment, the information processing apparatus according to the present invention further comprises order-of-precedence setting means for setting an order of precedence of the plurality of output units, wherein the first and second specifying means specify the main output unit and the auxiliary output unit based upon the order of precedence set by the setting means.

In a preferred embodiment of the information processing apparatus, the first specifying means specifies an output unit which is free of trouble and has a high level of precedence as the main output unit before data is supplied by the data supplying means.

In a preferred embodiment of the information processing apparatus, the second specifying means specifies an output unit, exclusive of the specified main output unit, which is free of trouble and has a high priority in the order of precedence as the auxiliary output unit.

In a preferred embodiment, the information processing apparatus according to the present invention further comprises message output means for outputting a message relating to an output unit which is a destination of data supplied by the data supply means.

In a preferred embodiment of the information processing apparatus, the message output by the message output means contains information indicating whether the supplied data has been processed appropriately in the output unit which is the destination of the data.

In a preferred embodiment of the information processing apparatus, the arrangement is such that if the data supply means supplies the specified auxiliary output unit with data, the data supplied includes data already supplied to the main output unit, in which a problem has developed.

In a preferred embodiment of the information processing apparatus, the arrangement is such that if the data supply means supplies the specified auxiliary output unit with data, the data includes data, already supplied to the main output unit in which a problem has developed, not processed appropriately in the main output unit.

In a preferred embodiment of the information processing apparatus, the data supplied by the data supply means contains printing data.

In a preferred embodiment, the information processing apparatus further comprises use inhibiting means for inhibiting use of a specific output unit among the plurality of output units.

A method of controlling an information processing apparatus having a function for outputting data to a plurality of output units, comprising a first specifying step of specifying one of the plurality of output units as a main output unit, a second specifying step of specifying one of the output units as an auxiliary output unit, an investigating step of investigating each output unit to determine whether the output unit has developed a problem, and a data supply step of supplying data to the specified main output unit if the main output unit has not developed a problem, and supplying data to the specified auxiliary output unit if the main output unit has developed a problem.

Further objects, features and advantages of the present invention will become apparent from the following detailed description of embodiments of the present invention with reference to the accompanying drawings.

BRIEF DESCRIPTION OF THE DRAWINGS

FIG. 3 is a diagram showing an example of a printer registration table registered based upon a registration program;

DETAILED DESCRIPTION OF THE PREFERRED EMBODIMENTS

An embodiment of the present invention will now be described with reference to the drawings.

Figure 1:
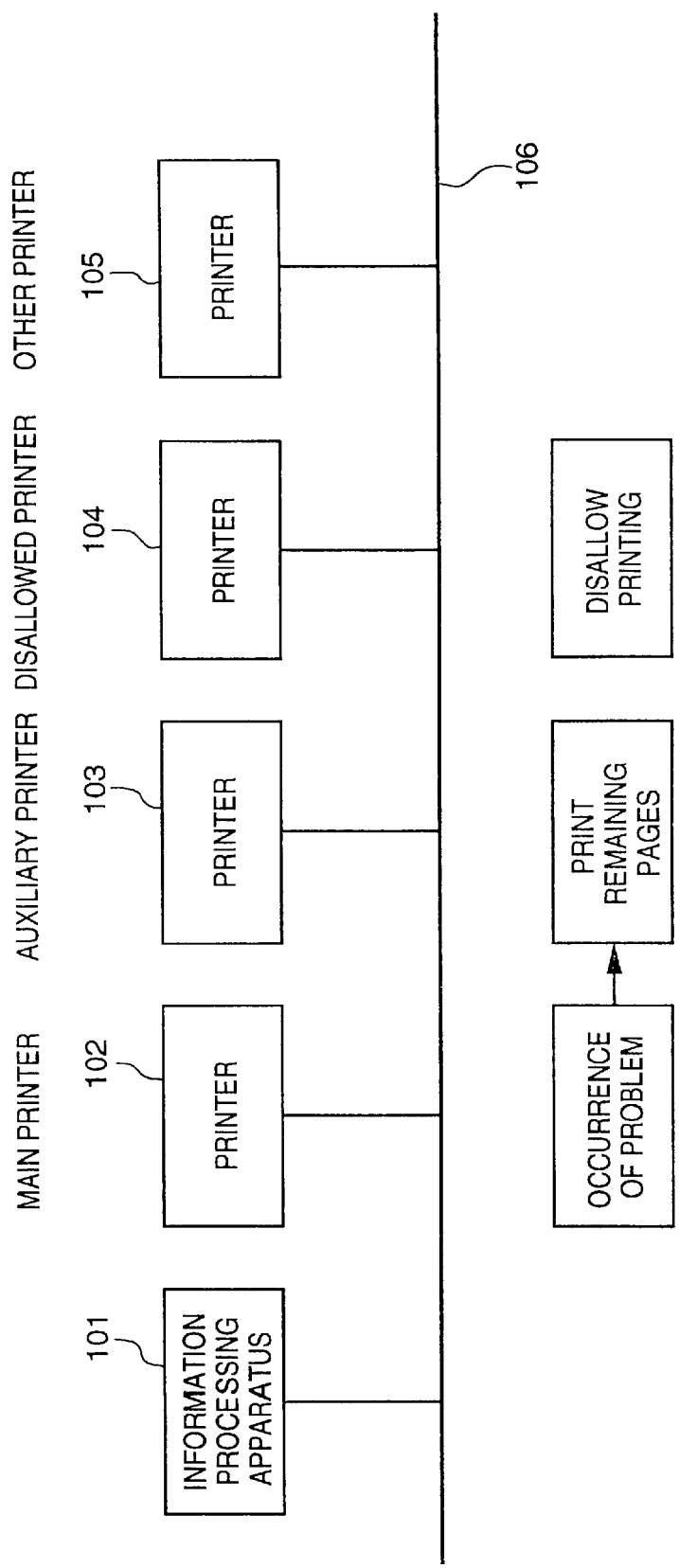
FIG. 1 is a diagram illustrating an example of the configuration of a printer system.

FIG. 1 is a diagram showing an example of the configuration of a printer system. The printer system includes an information processing apparatus 101 such as a personal computer or a work station, and a plurality of printers 102~105. The information processing apparatus 101 and the plurality of printers 102~105 are connected by a communication line 106.

The printers 102~105 have an order of precedence and the modes of use are decided in conformity with the order of precedence. In the illustrated example, the printer 102 is used as a printer (referred to as a "main printer" below) which, under normal conditions, is the destination of an output. The printer 103 is used as a printer (referred to as an "auxiliary printer" below) that serves as a substitute for the main printer 102 if the main printer develops a problem (paper depletion, jamming, toner depletion, etc.). The printer 103 is a printer (referred to as a "disallowed printer" below) whose use with the information processing apparatus 101 is not allowed. For example, use of this printer is inhibited because it is employed as the exclusive printer of another information processing apparatus (not shown) or because it has been installed at a remote location. The printer 105 is a printer (referred to as "the other printer" below) that does not apply to any of the foregoing conditions. For example, this is used as a printer capable of being optionally selected by the information processing apparatus 101 as the destination of an output.

If the main printer develops a problem, the information processing apparatus 101 causes printing to be performed using the auxiliary printer. For example, in a case where the main printer is used to print a plurality of (N-number of) documents, wherein each document consists of a plurality of (M-number of) pages, assume that the main printer develops a problem during printing of page Ml ($1 \leq M1 \leq M$) of an (N1)th document C ($1 \leq N1 \leq N$). If this occurs, the auxiliary printer is substituted for the main printer as the destination of the output and, by way of example, N documents of M pages each are printed.

Figure 2:
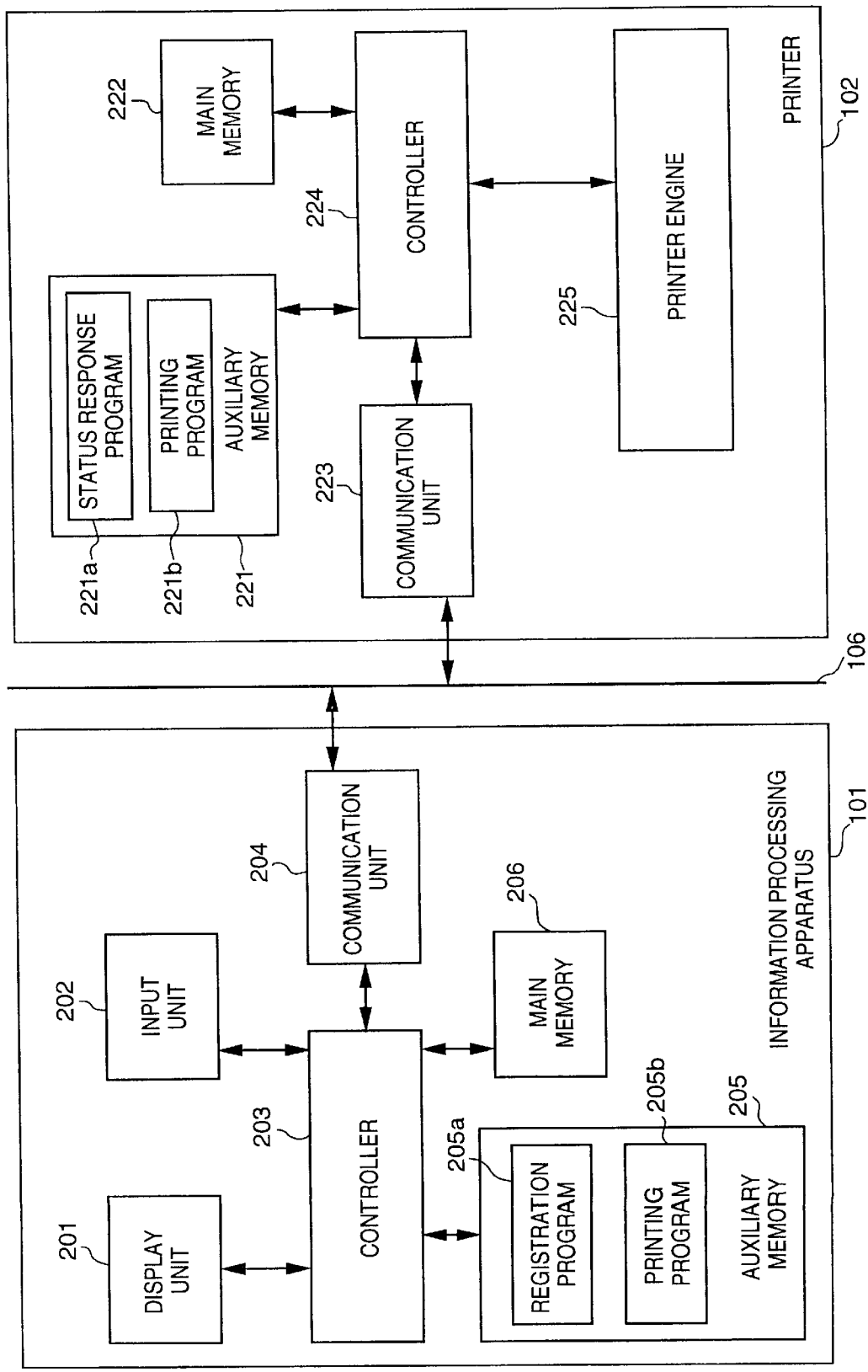
FIG. 2 is a block diagram illustrating an example of the construction of an information processing apparatus and the construction of a printer.

FIG. 2 is a block diagram showing an example of the construction of the information processing apparatus and printer. In this embodiment, the printers 103~105 are identical to the printer 102 in terms of construction. Accordingly, the printer 102 will be described as being typical of the printers 102~105.

The information processing apparatus 101 includes a display 201 such as a CRT display, an input unit 202 such as a keyboard or mouse, a controller 203 which includes a microprocessor that operates based upon a control program, a communication unit 204 connected to the printer, an auxiliary memory 205 storing control programs (inclusive of a registration program 205a, a printing program 205b, an operating system and application programs, etc.) and a main memory 206 which functions as the working memory of the controller 203.

The registration program 205a is for registering the order of precedence of the printers 102~105, etc. Further, the printing program 205b specifies the printer that is the destination of an output and controls printing in accordance with content, which has been registered based upon the registration program 205a, and the status of each printer. The codes of the control programs are read into the main memory 206 from the auxiliary memory 205 so that they may be executed while in the main memory 206. By supplying the registration program 205a and printing program 205b to an ordinary information processing apparatus, the functions of the information processing apparatus are specified so that an information processing apparatus in accordance with this embodiment of the invention can be implemented.

The printer 102 (and the printers 103~105 as well) includes an auxiliary memory 211 storing control programs (inclusive of a status response program 221a, a printing program 221b, etc.), a communication unit 223 connected to the information processing apparatus 101, a controller 224 which includes a microprocessor that operates based upon the control programs, a main memory 222 which functions as the working memory of the controller 224, and a printer engine 225 for forming an image based upon the printing data. The codes of the control programs are read into the main memory 222 so that they may be executed while in the main memory 222.

FIG. 3 is a diagram showing an example of a printer registration table registered based upon the registration program 205a. A registration table 300 registers the corresponding relationship among printer name, printer priority and printer location with regard to the printers connected to the information processing apparatus 101 via the communication unit 204.

As shown in the example of FIG. 3, "LBP1"~"LBP4" have been registered as the printer names and "1", "2", "3" and "0" have been as the priorities of LBP1 (printer 102), LBP2 (printer 103), LBP3 (printer 105) and LBP4 (printer 104), respectively. The priorities increase in the order "1", "2", "3" . . . , and "0" indicates a disallowed printer. When printing is executed, the main printer and auxiliary printer are decided in the order of decreasing priority based upon the priorities of the printers capable of being used. The location of a printer is specified by the port possessed by the communication unit 204.

Figure 4:
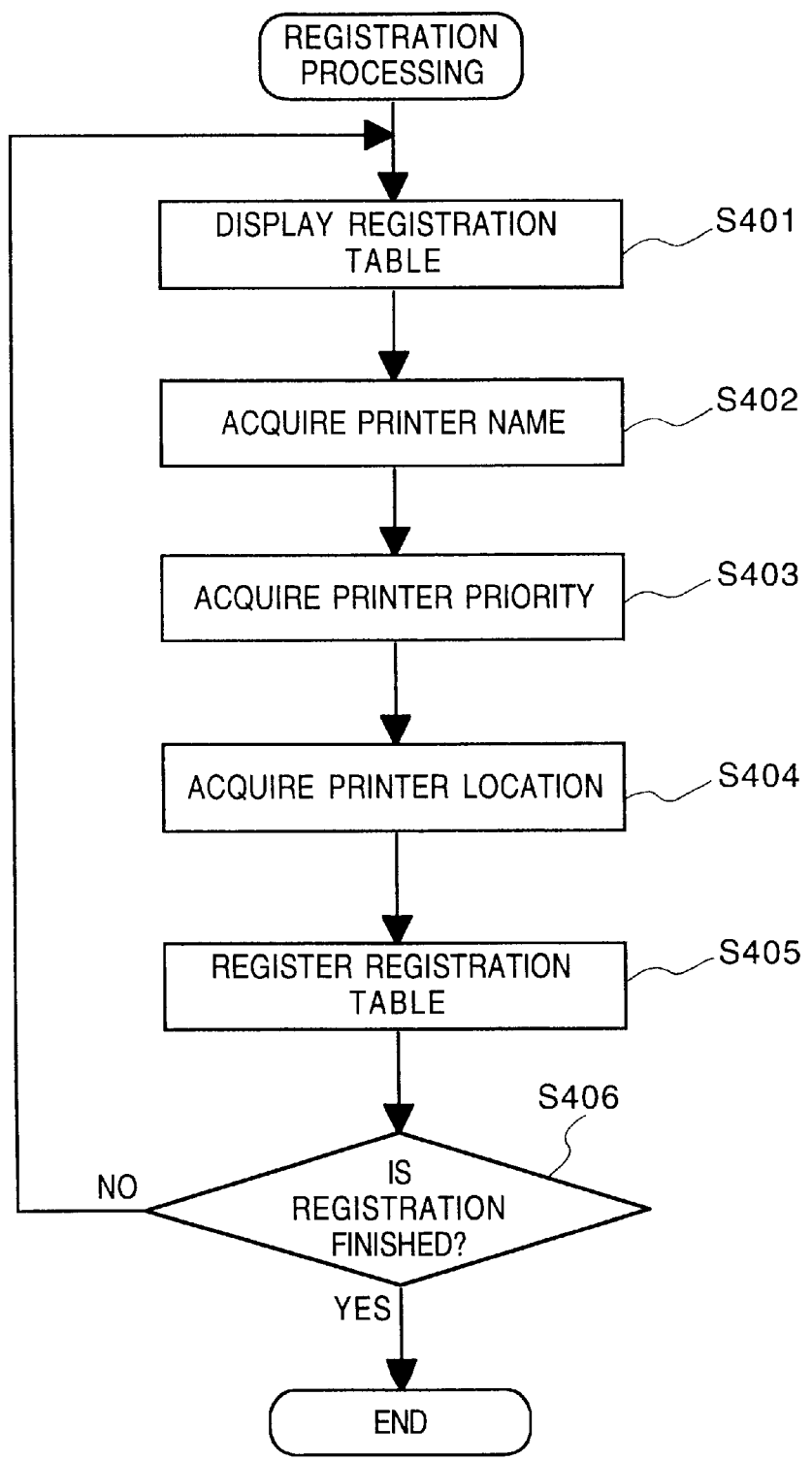
FIG. 4 is a flowchart illustrating the flow of registration processing in the information processing apparatus.

FIG. 4 is a flowchart illustrating the flow of processing (referred to as "registration processing" below) executed by the information processing apparatus 101 for registering the names, priorities and locations of the printers in the registration table 300. This registration processing is controlled by the controller 203 based upon the registration program 205a. In addition, the registration processing is started up based upon an indication from the user entered via the input unit 202.

The registration table 300 is read into the main memory 206 from the auxiliary memory 205 and is displayed on the display 201 at step S401. A message prompting the user to enter a printer name is displayed on the display 201 and the printer name entered via the input unit 202 is acquired and stored in a predetermined area of the main memory 206 at step S402. This is followed by step S403, at which a message prompting the user to enter the printer priority is displayed on the display 201 and the printer priority information entered via the input unit 202 is acquired and stored in a predetermined area of the main memory 206. Next, at step S404, a message prompting the user to enter the printer location (port) is displayed on the display 201 and the printer position information entered via the input unit 202 is acquired and stored in a predetermined area of the main memory 206.

This is followed by step S405, at which the printer name, printer priority information and printer location information that have been stored in the predetermined areas of the main memory 206 are registered in the registration table 300 in corresponding fashion, after which the registration table is stored in the auxiliary memory 205. Next, based upon an indication from the user entered via the input unit 202, it is determined whether to end registration processing. If registration is to be performed with regard to another printer ("NO" at step S406), then the program returns to step S401.

Figure 5:
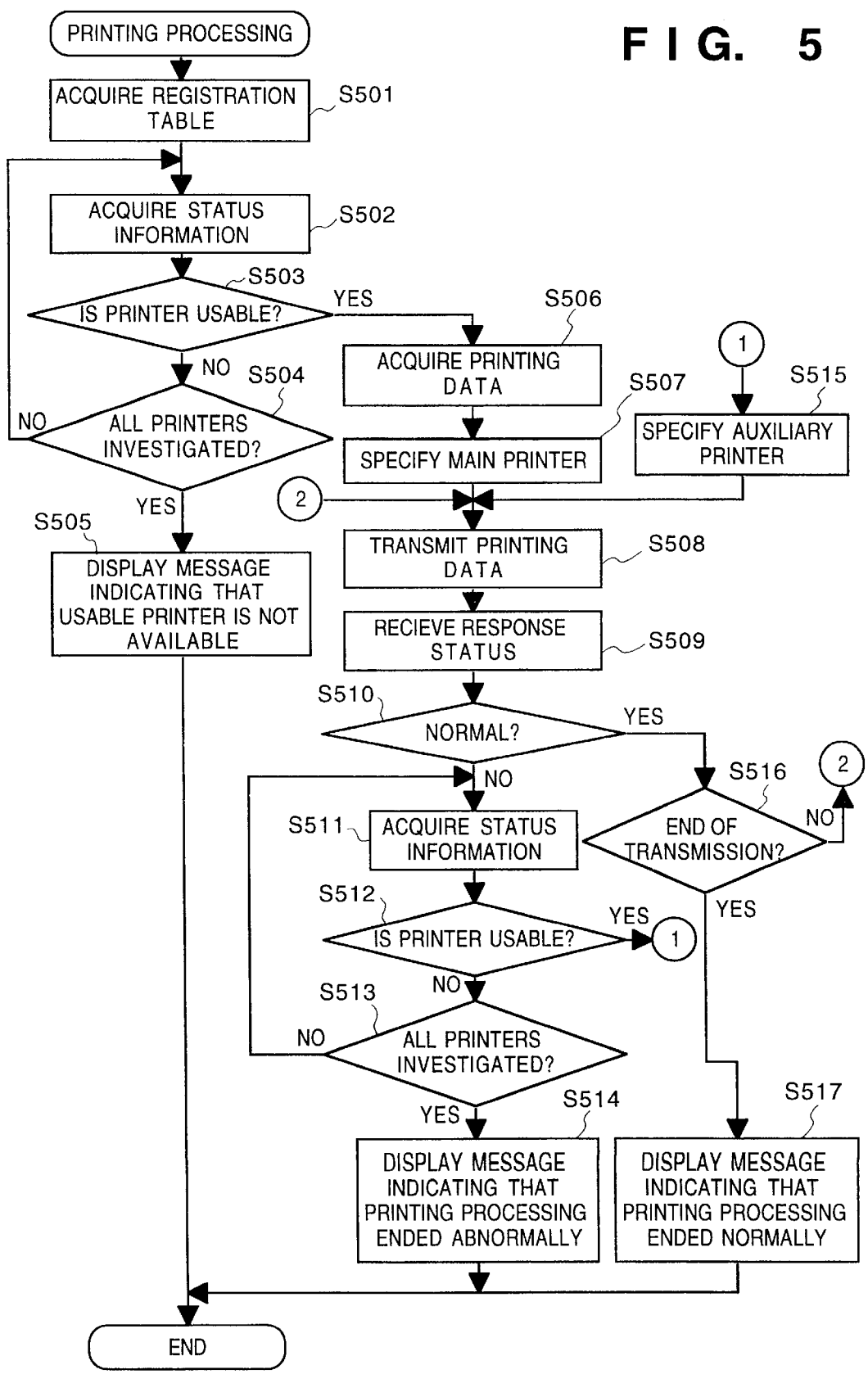
FIG. 5 is a flowchart illustrating the flow of printing processing in the information processing apparatus.

FIG. 5 is a flowchart illustrating the flow of the operation, which relates to printing processing, performed by the information processing apparatus 101. Printing processing is controlled by the controller 203 based upon the printing program 205b and is started up when the user indicates execution of printing via the input unit 202.

The registration table 300 is read into the main memory 206 from the auxiliary memory 205 at step S501. This is followed by steps S502~S504, at which the printers capable of being used are investigated in the order of decreasing priority. More specifically, a printer having a high priority is specified based upon the registration table 300 and the status information of this printer is acquired via the communication unit 204 at step S502. If a usable printer is available ("YES" at step S503), then the program proceeds to step S506. This is followed by step S503, at which it is determined, based upon the status information, whether the printer is capable of being used. The program proceeds to step S506 if the printer is usable ("YES" at step S503) and to step S504 if the printer is not usable ("NO" at step S503). It is determined at step S504 whether the states of all printers, with the exception of the disallowed printer (whose priority is "0"), have been investigated. If a printer not yet investigated remains ("NO" at step S504), the program returns to step S502. If all printers except for the disallowed printer have been investigated ("YES" at step S504), then the program returns to step S505.

If it is determined at step S504 that the states of all printers except for the disallowed printer have been investigated, this means that a usable printer does not exist. Accordingly, a message to the effect that a usable printer is not available is displayed on the display unit 201 at step S505.

The printing data is acquired from the auxiliary memory 205, for example, at step S506. Next, at step S507, the printer determined to be usable at step S503 is adopted as the main printer. This is followed by step S508, at which part (e.g., one page) of the printing data is transmitted to the main printer (the auxiliary printer if the main printer has developed a problem, in which case the processing will have proceeded to step S508 from step S515) via the communication unit 204.

Next, at step S509, response status information from the main printer is received via the communication unit 204, the response status information is investigated at step S510 and the program proceeds to step S516 if the main printer is normal and to step S511 if the printer has developed a problem.

If the main printer is normal, it is determined at step S516 whether all printing data has been transmitted to the main printer. That is, it is determined whether printing has finished. If it is determined that printing has finished ("YES" at step S516), the program proceeds to step S517, at which a message to the effect that printing has ended normally is displayed on the display 201, after which processing is terminated. It is preferred that the message include information indicating which printer performed the printing. If it is determined that printing is not yet finished ("NO" at step S516), then the program returns to step S508 and the next part of the printing data (e.g., one page) is transmitted to the main printer.

If it is determined at step S510 that the main printer has developed a problem, then, at steps S511~S513, the printers other than the main printer and disallowed printer are investigated in the order of decreasing priority to determine whether a usable printer is available. If a usable printer is available ("YES" at step S512), then the program proceeds to step S515. More specifically, based upon the registration table 300, a printer having a high priority is specified among the printers with the exception of the main printer and disallowed printer and the status information of this printer is acquired via the communication unit 204. Based upon this status information, it is determined at step S512 whether this printer is capable of being used or not. The program proceeds to step S515 if the printer is usable and to step S513 if the printer is not usable. It is determined at step S513 whether the states of all printers except for the main printer and disallowed printer have been investigated, and the program returns to step S511 if a printer not yet investigated exists. If all printers with the exception of the main printer and disallowed printer have been investigated, then the program proceeds to step S514.

The printer specified at step S512 is made the auxiliary printer at step S515, after which the program proceeds to step S508. In this case the processing from step S508 onward is executed with regard to the auxiliary printer. In accordance with this preferred embodiment of the invention, the printing data is re-transmitted to the auxiliary printer from the beginning of the data in a case where processing has made the transition from step S508 to step S509.

A message to the effect that printing processing ended abnormally is displayed on the display 201 at step S514, after which processing is terminated. This message includes information indicating which printer performed printing.

Figure 6:
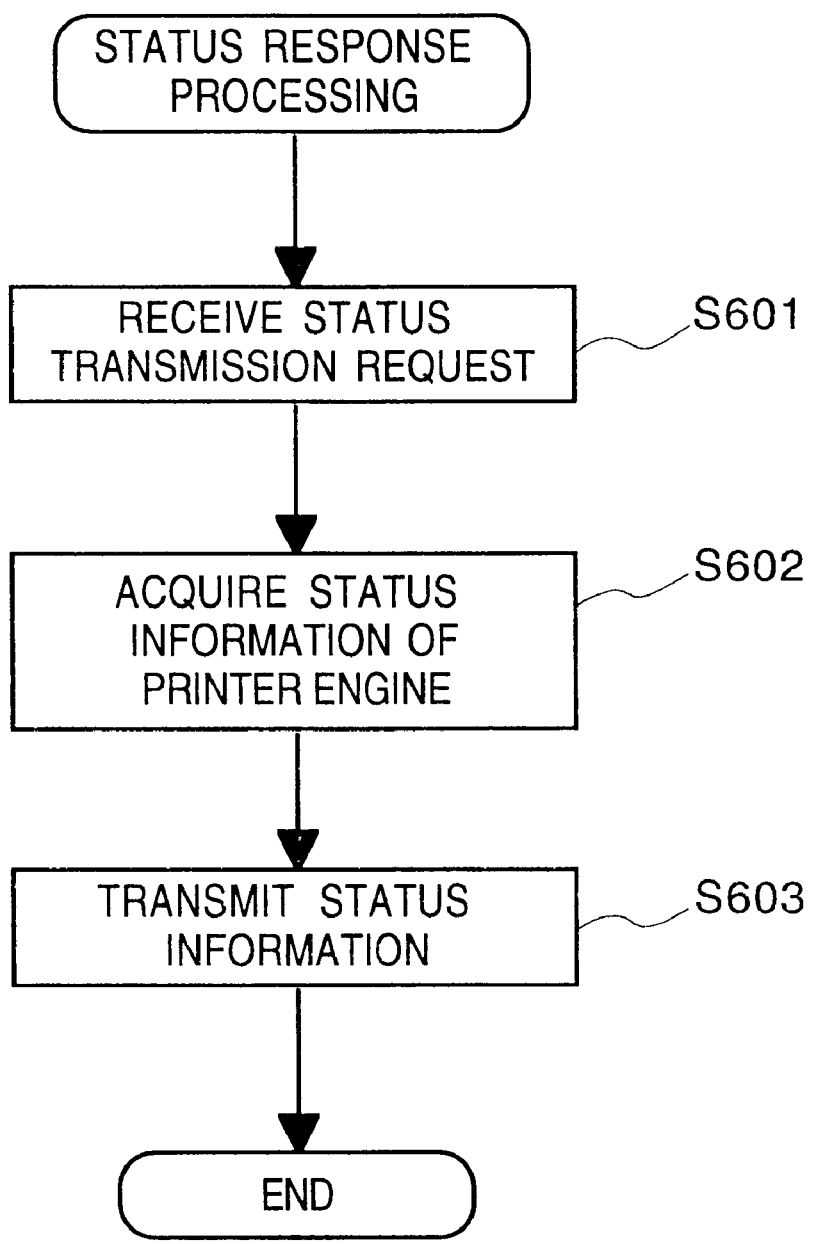
FIG. 6 is a flowchart illustrating the flow of status response processing in a printer.

An example of operation of the printer 102 (which operates in the same manner as the printers 103~105 as well) will now be described with reference to FIGS. 6 and 7. FIG. 6 is a flowchart illustrating the flow of processing (status response processing) for transmitting status information to the information processing apparatus 101 in response to a status transmission request from the information processing apparatus 101. The status response processing is controlled by the controller 224 based upon the status response program 221a.

The status transmission request from the information processing apparatus 101 is received via the communication unit 223 at step S601. This is followed by step S602, at which the status information (information relating to paper depletion, jamming, toner depletion, etc.) representing the status of the printer engine 225 is acquired. The status information is transmitted to the information processing apparatus 101 at step S603. The status response processing corresponds to the processing of step S502 in FIG. 5.

Figure 7:
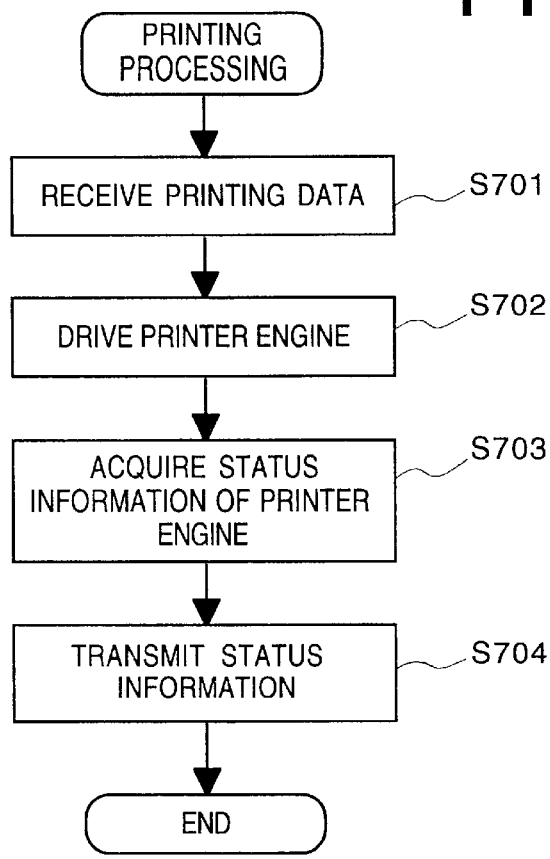
FIG. 7 is a flowchart illustrating the flow of printing processing in a printer.

FIG. 7 is a flowchart illustrating the flow of printing processing based upon the printing data sent from the information processing apparatus 101. The printing processing is controlled by the controller 224 based upon the printing program 221b.

Printing data (one page of the data, for example) that has been sent from the information processing apparatus 101 is received via the communication unit 223 at step S701 and the printer engine 225 is driven based upon the printing data at step S702 to thereby execute printing. This is followed by step S703, at which the status information (information relating to paper depletion, jamming, toner depletion, etc.) representing the status of the printer engine 225 is acquired. The status information is transmitted to the information processing apparatus 101 at step S704.

As described above, the information processing apparatus 101 transmits part (e.g. one page) of the printing data to the main printer, acquires the status information relating to printing processing from the main printer, checks the status of the printer and, if the main printer is operating normally, then transmits the printing data to the main printer. By repeating this operation, the information processing apparatus 101 executes processing with regard to all printing data. If the main printer develops a problem during the execution of this processing, then the information processing apparatus 101 specifies the auxiliary printer and makes the auxiliary printer the destination of the output.

The foregoing description is an example in which the main printer, auxiliary printer and other printers are decided dynamically based upon the priorities of the usable printers. However, the invention is applicable also to a case where the printers are set in static fashion.

Further, the foregoing description is an example in which all printing data are output again using the auxiliary printer if the main printer develops a problem. However, the mode of use of the auxiliary printer is not limited to this example. Other examples of modes of use of the auxiliary printer will now be described.

FIRST EXAMPLE

In a case where a problem has developed in the main printer, this example in such that all pages of the document that was being printed at occurrence of the problem are output using the auxiliary printer. Subsequent documents are output using the main printer again.

For example, in a case where the main printer is used to print a plurality of (N-number of) documents, wherein each document consists of a plurality of (M-number of) pages, assume that the main printer develops a problem during printing of page M1 ($1 \leq M1 \leq M$) of an (N1)th document ($1 \leq N1 \leq N$). If this occurs, the auxiliary printer is substituted for the main printer as the destination of the output, all pages of the (N1) th document are output using the auxiliary printer, and documents from the (N1+1)th document onward are output using the main printer again. Such control can be implemented, for example, by starting up the processing of the flowchart of FIG. 5 on a per-document basis. In this case, it is necessary that the problem with the main printer be solved before the documents from the (N1+1)th document onward are output.

SECOND EXAMPLE

In this example, documents not yet output are output using the auxiliary printer when a problem has developed in the main printer.

For example, in a case where the main printer is used to print a plurality of (N-number of) documents, wherein each document consists of a plurality of (M-number of) pages, assume that the main printer develops a problem during printing of page M1 ($1 \leq M1 \leq M$) of an (N1)th document ($1 \leq N1 \leq N$). If this occurs, the auxiliary printer is substituted for the main printer as the destination of the output and documents from page M1 of the (N1) th document to page M of the Nth document are output using the auxiliary printer. Such control can be implemented, for example, by changing the processing of step S508, in a case where a transition has been made from step S515 to step S508, in such a manner that step S508 will transmit data which corresponds to the documents that follow the page sent to the main printer last.

THIRD EXAMPLE

In a case where a problem has developed in the main printer, this example in such that only unprinted pages of the document that was being printed at occurrence of the problem are output using the auxiliary printer. Subsequent documents are output using the main printer again.

For example, in a case where the main printer is used to print a plurality of (N-number of) documents, wherein each document consists of a plurality of (M-number of) pages, assume that the main printer develops a problem during printing of page M1 ($1 \leq M1 \leq M$) of an (N1)th document ($1 \leq N1 \leq N$). If this occurs, the auxiliary printer is substituted for the main printer as the destination of the output, pages from M1 onward of the (N1)th document are output using the auxiliary printer, and documents from the (N1+1)th document onward are output using the main printer again. Such control can be implemented, for example, by starting up the processing of the flowchart of FIG. 5 on a per-document basis and changing the processing of step S508, in a case where a transition has been made from step S515 to step S508, in such a manner that step S508 will transmit data which corresponds to the documents that follow the page sent to the main printer last.

In accordance with this embodiment of the invention, as described above, the usage of each printer connected to the information processing apparatus can be defined by deciding which printer is the main printer, which is an auxiliary printer and which is a disallowed printer. This makes it possible to use the printer system efficiently and smoothly.

In a case where the main printer and auxiliary printer have been decided and the main printer develops a problem, the destination of the output is changed over to the auxiliary printer automatically so that the output of printing data may continue, thereby preventing interruption of the printing job and increasing the overall throughput of printing processing.

Further, by allocating the role of each printer dynamically based upon the priority of each printer, it is possible to prevent interruption of printing processing due to a problem in a specific printer.

The present invention can be applied to a system constituted by a plurality of devices (e.g., a host computer, interface, reader, printer, etc.) or to an apparatus comprising a single device (e.g., a copier or facsimile machine, including a plurality of printers etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 8:
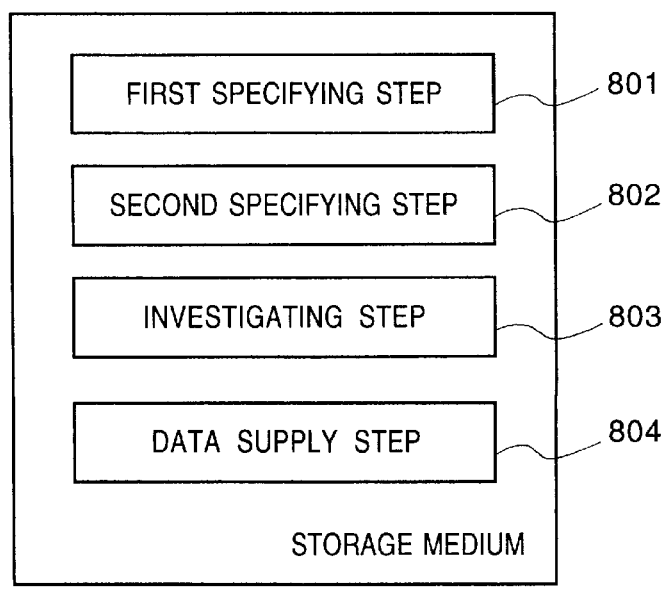
FIG. 8 is a diagram showing an example of the memory map of a storage medium storing programs codes for implementing the present invention.

In a case where the present invention is applied to the above-mentioned storage medium, program codes corresponding to the flowcharts described earlier are stored on this storage medium. FIG. 8 is a diagram showing an example of the memory map of a storage medium storing programs codes for implementing the present invention. A code 801 of a first specifying step corresponds to step S507, etc., by way of example A code 802 of a second specifying step corresponds to step S515, etc., by way of example. A code 803 of an investigating step corresponds to step S510, etc., by way of example. A code 804 of a data supply step corresponds to step S508, etc., by way of example.

In accordance with the present invention, an advantage obtained is that by specifying the usage of each output unit in an information processing apparatus having a function for outputting data to the plurality of output units, output processing can be executed efficiently and smoothly.

The present invention is not limited to the above embodiments and various changes and modifications can be made within the spirit and scope of the present invention. Therefore, to apprise the public of the scope of the present invention, the following claims are made.

What is claimed is:

1. An information processing apparatus having a function of outputting data to a plurality of output units, comprising:

setting means for setting said information processing apparatus, before data outputting is performed, to a state in which said information processing apparatus is inhibited from using a specific output unit from among the plurality of output units;

first specifying means for specifying one of the plurality of output units for which use is not inhibited in accordance with the state set by said setting means as a main output unit to be used by said information processing apparatus;

second specifying means for specifying one of the plurality of output units for which use is not inhibited in accordance with the state set by said setting means as an auxiliary output unit which substitutes for the specified main output unit; and data supply means for supplying data to the specified main output unit if the main output unit has not developed a problem, and supplying data to the specified auxiliary output unit if the main output unit has developed a problem.

2. The apparatus according to claim 1, further comprising order-of-precedence setting means for setting an order of precedence of the plurality of output units, wherein said first and second specifying means specify the main output unit and the auxiliary output unit based upon the order of precedence set by said order-of-precedence setting means.

3. The apparatus according to claim 2, wherein said first specifying means specifies an output unit which is free of trouble and has a high level of precedence as the main output unit before data is supplied by said data supplying means.

4. The apparatus according to claim 3, wherein said second specifying means specifies an output unit, exclusive of the specified main output unit, which is free of trouble and has a high level of precedence as the auxiliary output unit.

5. The apparatus according to claim 1, further comprising message output means for outputting a message relating to an output unit which is a destination of data supplied by said data supply means.

6. The apparatus according to claim 5, wherein the message output by said message output means contains information indicating whether the supplied data has been processed appropriately in the output unit which is the destination of the data.

7. The apparatus according to claim 1, wherein if said data supply means supplies the specified auxiliary output unit with data, the data supplied includes data already supplied to the main output unit, in which a problem has developed.

8. The apparatus according to claim 1, wherein if the data supply means supplies the specified auxiliary output unit with data, the data sent includes data, already supplied to the main output unit in which a problem has developed, processed inappropriately in the main output unit.

9. The apparatus according to claim 1, wherein the data supplied by said data supply means contains printing data.

10. A method of controlling an information processing apparatus having a function of outputting data to a plurality of output units, comprising:

a setting step of setting the information processing apparatus, before data outputting is performed, to a state in which the information processing apparatus is inhibited from using a specific output unit from among the plurality of output units;

a first specifying step of specifying one of the plurality of output units for which use is not inhibited in accordance with the state set in said setting step as a main output unit to be used by the information processing apparatus;

a second specifying step of specifying one of the plurality of output units for which use is not inhibited in accordance with the state set in said setting step as an auxiliary output unit which substitutes for the specified main output unit; and a data supply step of supplying data to the specified main output unit if the main output unit has not developed a problem, and supplying data to the specified auxiliary output unit if the main output unit has developed a problem.

11. The method according to claim 10, further comprising an order-of-precedence setting step of setting an order of precedence of the plurality of output units, wherein said first and second specifying steps specify the main output unit and the auxiliary output unit based upon the order of precedence set at said order-of-precedence setting step.

12. The method according to claim 11, wherein said first specifying step specifies an output unit which is free of trouble and has a high level of precedence as the main output unit before data is supplied at said data supplying step.

13. The method according to claim 12, wherein said second specifying step specifies an output unit, exclusive of the specified main output unit, which is free of trouble and has a high level of precedence as the auxiliary output unit.

14. The method according to claim 10, further comprising a message output step of outputting a message relating to an output unit which is a destination of data supplied at said data supply step.

15. The method according to claim 14, wherein the message output at said message output step contains information indicating whether the supplied data has been processed appropriately in the output unit which is the destination of the data.

16. The method according to claim 10, wherein if said data supply step supplies the specified auxiliary output unit with data, the data supplied includes data already supplied to the main output unit, in which a problem has developed.

17. The method according to claim 10, wherein if the data supply step supplies the specified auxiliary output unit with data, the data sent includes data, already supplied to the main output unit in which a problem has developed, processed inappropriately in the main output unit.

18. The method according to claim 10, wherein the data supplied at said data supply step contains printing data.

19. A computer readable memory storing control program codes of an information processing apparatus having a function of outputting data to a plurality of output units, comprising:

codes of a setting step of setting the information processing apparatus, before data outputting is performed, to a state in which the information processing apparatus is inhibited from using a specific output unit from among the plurality of output units;

codes of a first specifying step of specifying one of the plurality of output units for which use is not inhibited in accordance with the state set in the setting step as a main output unit to be used by the information processing apparatus;

codes of a second specifying step of specifying one of the plurality of output units for which use is not inhibited in accordance with the state set in the setting step as an auxiliary output unit which substitutes for the specified main output unit; and codes of a data supply step of supplying data to the specified main output unit if the main output unit has not developed a problem, and supplying data to the specified auxiliary output unit if the main output unit has developed a problem.

20. An information processing apparatus having a function of outputting data to a plurality of output units, comprising:

setting means for setting said information processing apparatus, before data outputting is performed, to a state in which said information processing apparatus is inhibited from using a specific output unit from among the plurality of output units which include an output unit available for use;

first specifying means for specifying one of the plurality of output units for which use is not inhibited in accordance with the state set by said setting means as a main output unit to be used by said information processing apparatus;

second specifying means for automatically specifying one of the plurality of output units as an auxiliary output unit which substitutes for the specified main output unit, based on a predetermined rule; and data supplying means for supplying data to the specified main output unit if the main output unit has not developed a problem, and supplying data to the specified auxiliary output unit if the main output unit has developed a problem.

21. An information processing apparatus having a function of outputting print data to be subjected to printing processing in printing apparatuses, said information processing apparatus comprising:

order setting means for setting an order of a plurality of printing apparatuses for performing printing processing by respectively assigning priority levels to the plurality of printing apparatuses before starting the printing processing, determination means for sequentially determining whether or not a printing apparatus of the plurality of printing apparatuses is capable of performing the printing processing in accordance with the order set by said order setting means in a case where the printing processing is set to be performed in a first printing apparatus and it is necessary to cause another printing apparatus different from the first printing apparatus to perform the printing processing; and output control means for controlling output processing for outputting printing data so that printing data which was to be outputted to the first printing apparatus is outputted to a second printing apparatus which is determined by said determination means as the printing apparatus capable of performing the printing processing.

22. The information processing apparatus according to claim 21, wherein said order setting means assigns a different priority level to each of the plurality of printing apparatuses.

23. The information processing apparatus according to claim 21, further comprising acquiring means for acquiring status information of the printing apparatuses, wherein said determination means determines whether or not the printing apparatus is capable of performing the printing processing based on the status information acquired by said acquiring means.

24. The information processing apparatus according to claim 21, further comprising display control means for controlling display of information indicating which printing apparatus of the plurality of printing apparatuses has performed the printing processing.

25. An information processing method of outputting print data to be subjected to printing processing in printing apparatuses, said information processing method comprising the steps of:

setting an order of a plurality of printing apparatuses for performing printing processing by respectively assigning priority levels to the plurality of printing apparatuses before starting the printing processing, sequentially determining whether or not a printing apparatus of the plurality of printing apparatuses is capable of performing the printing processing in accordance with the order set in said order setting step in a case where the printing processing is set to be performed in a first printing apparatus and it is necessary to cause another printing apparatus different from the first printing apparatus to perform the printing processing; and controlling output processing for outputting printing data so that printing data which was to be outputted to the first printing apparatus is outputted to a second printing apparatus which is determined in said determining step as the printing apparatus capable of performing the printing processing.

26. The information processing method according to claim 25, wherein, in said order setting step, a different priority level is assigned to each of the plurality of printing apparatuses.

27. The information processing method according to claim 25, further comprising a step of acquiring status information of the printing apparatuses, wherein, in said determining step, the determination of whether or not the printing apparatus is capable of performing the printing processing is based on the status information acquired in said acquiring step.

28. The information processing method according to claim 25, further comprising the step of controlling display of information indicating which printing apparatus of the plurality of printing apparatuses has performed the printing processing.

29. A computer-readable medium storing computer program code for instructing a computer to perform an information processing method of outputting print data to be subjected to printing processing in printing apparatuses, said information processing method comprising the steps of:

setting an order of a plurality of printing apparatuses for performing printing processing by respectively assigning priority levels to the plurality of printing apparatuses before starting the printing processing, sequentially determining whether or not a printing apparatus of the plurality of printing apparatuses is capable of performing the printing processing in accordance with the order set in said order setting step in a case where the printing processing is set to be performed in a first printing apparatus and it is necessary to cause another printing apparatus different from the first apparatus to perform the printing processing; and controlling output processing for outputting printing data so that printing data which was to be outputted to the first printing apparatus is outputted to a second printing apparatus which is determined in said determining step as the printing apparatus capable of performing the printing processing.

30. The computer-readable medium according to claim 29, wherein, in said order setting step of the information processing method, a different priority level is assigned to each of the plurality of printing apparatuses.

31. The computer-readable medium according to claim 29, further comprising program code for instructing the computer to perform an additional step of acquiring status information of the printing apparatuses, wherein, in said determining step, the determination of whether or not the printing apparatus is capable of performing the printing processing is based on the status information acquired in said acquiring step.

32. The computer-readable medium according to claim 29, further comprising program code for instructing the computer to perform an additional step of controlling display of information indicating which printing apparatus of the plurality of printing apparatuses has performed the printing processing.

33. A computer-readable program for controlling a computer to perform an information processing method of outputting print data to be subjected to printing processing in printing apparatuses, said information processing method comprising the steps of:

setting an order of a plurality of printing apparatuses for performing printing processing by respectively assigning priority levels to the plurality of printing apparatuses before starting the printing processing, sequentially determining whether or not a printing apparatus of the plurality of printing apparatuses is capable of performing the printing processing in accordance with the order set in said order setting step in a case where the printing processing is set to be performed in a first printing apparatus and it is necessary to cause another printing apparatus different from the first printing apparatus to perform the printing processing; and controlling output processing for outputting printing data so that printing data which was to be outputted to the first printing apparatus is outputted to a second printing apparatus which is determined in said determining step as the printing apparatus capable of performing the printing processing.

34. The program according to claim 33, wherein, in said order setting step, a different priority level is assigned to each of the plurality of printing apparatuses.

35. The program according to claim 33, further controlling the computer to perform the additional step of acquiring status information of the printing appartuses, wherein, in said determining step, the determination of whether or not the printing apparatus is capable of performing the printing processing is based on the status information acquired in said acquiring step.

36. The program according to claim 33, further controlling the computer to perform the additional step of controlling display of information indicating which printing apparatus of the plurality of printing apparatuses has performed the printing processing.

37. A computer system configured to output print data to be subjected to printing processing in a printer, said system comprising:

a micrprocessor; and a memory storing programs and a registration table configured to operate said computer system, the registration table storing priority levels indicating the order of the plurality of printers, wherein, in a case where it is necessary to set a printer for printing processing, said microprocessor receives status information from a printer of the plurality of printers indicating whether the printer is capable of performing printing processing in accordance with the order of the printers registered in the registration table and repeats the operation for a next printer if the status information indicates that the printer is not able to perform the printing processing, and wherein said microprocessor outputs print data to the printer found to be capable of performing the printing processing.

38. The computer system according to claim 37, wherein, in the registration table, each of the plurality of printers has a different priority level.

39. The computer system according to claim 37, wherein said microprocessor is configured to control the display of information indicating which printer of the plurality of printers has performed the printing processing.

* * * * *

UNITED STATES PATENT AND TRADEMARK OFFICE
CERTIFICATE OF CORRECTION

PATENT NO. : 6,384,925 B1
DATED : May 7, 2002
INVENTOR(S) : Hiroyuki Fujiyoshi

It is certified that error appears in the above-identified patent and that said Letters Patent is hereby corrected as shown below:

Column 7,
Line 33, "example in" should read -- example is --.

Column 8,
Line 9, "in" should read -- is --.

Column 9,
Line 24, "example A" should read -- example. A --.

Column 13,
Line 26, "first" should read -- first printing --.

Signed and Sealed this

Twenty-second Day of October, 2002

Attest:

JAMES E. ROGAN
Attesting Officer         Director of the United States Patent and Trademark Office